United States Patent [19]
Hendrickson

[11] 3,743,060
[45] July 3, 1973

[54] SERVO ACTION PARKING BRAKE WITH ROTARY ACTUATOR
[75] Inventor: Paul G. Hendrickson, Ann Arbor, Mich.
[73] Assignee: Kelsey-Hayes Company, Romulus, Mich.
[22] Filed: Oct. 27, 1970
[21] Appl. No.: 86,118

[52] U.S. Cl. ............ 188/72.2, 188/72.6, 188/106 F, 188/196 P
[51] Int. Cl. ............................................. F16d 55/46
[58] Field of Search................ 188/71.8, 72.2, 72.6, 188/72.7, 106 F, 196 P

[56]         References Cited
          UNITED STATES PATENTS
3,266,602  8/1966  Belart et al. ................... 188/72.6 X
3,321,049  5/1967  Swift ............................. 188/72.2 X
2,814,366  11/1957  Lucien............................ 188/196 P
3,371,750  3/1968  Schutte et al...................... 188/71.8
3,532,196  10/1970  Winge............................. 188/72.2

FOREIGN PATENTS OR APPLICATIONS
1,129,106  10/1968  Great Britain..................... 188/72.7
1,489,537  6/1967   France............................ 188/72.2

Primary Examiner—George E. A. Halvosa
Attorney—Harness, Dickey & Pierce

[57]            ABSTRACT

A sliding caliper disk brake assembly incorporating a hydraulic, service actuator and a mechanical, parking actuator. The mechanical actuator includes an annular cam that is disposed concentrically with the piston of the hydraulic actuator to provide a compact assembly. An arrangement is also incorporated for generating a self-energizing force when the brake is mechanically actuated.

6 Claims, 6 Drawing Figures

INVENTOR
Paul G. Hendrickson
BY
Harness, Dickey & Pierce
ATTORNEYS.

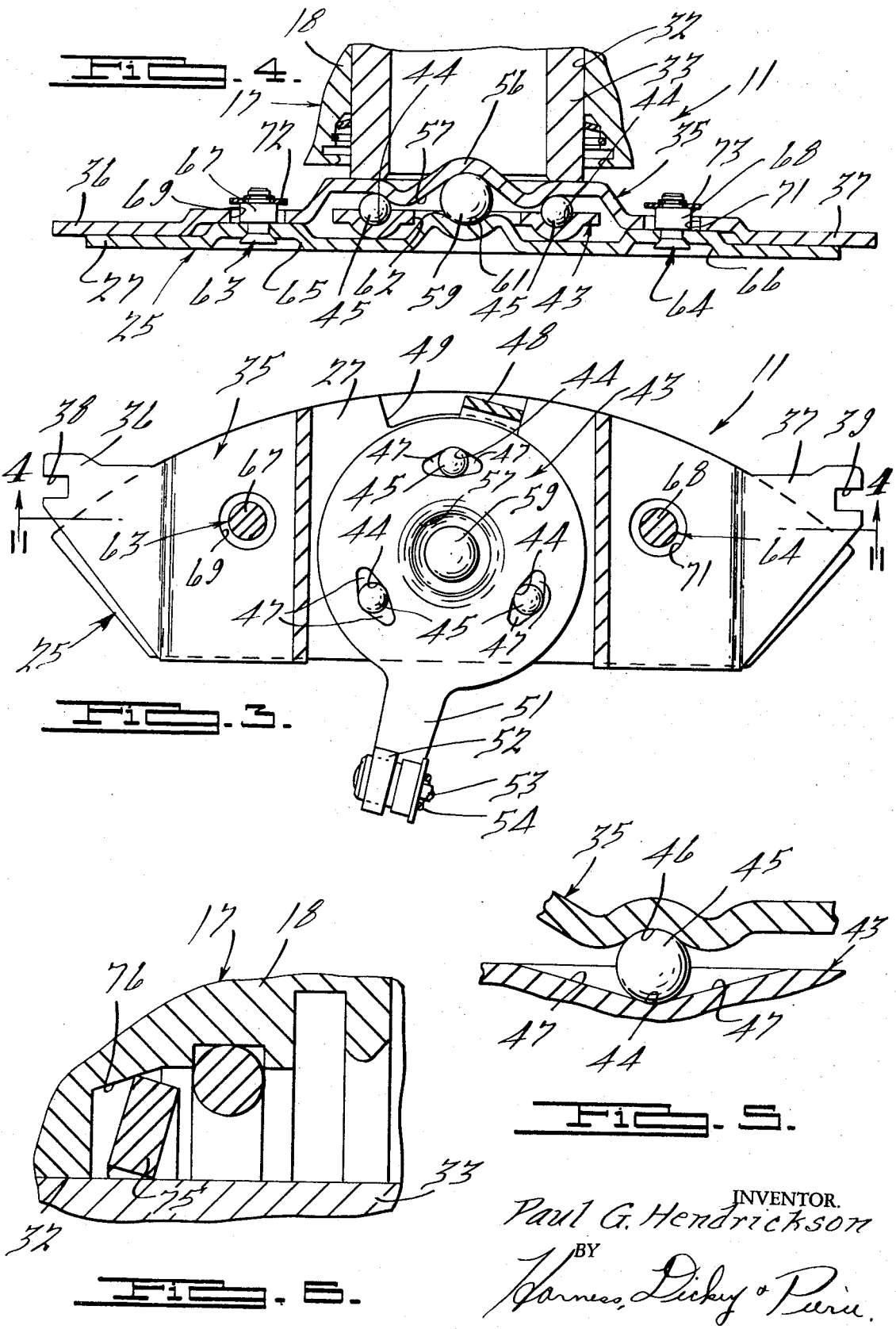

SERVO ACTION PARKING BRAKE WITH ROTARY ACTUATOR

BACKGROUND OF THE INVENTION

This invention relates to a disk brake assembly and more particularly to an improved disk brake assembly incorporating a servo action parking brake with a rotary actuator.

The application of disk brakes to motor vehicles has been limited to use on the front wheels, except for certain high priced or special purpose vehicles. One reason disk brakes have not been used with the rear vehicle wheels is the difficulty in providing a satisfactory mechanical actuator for the parking brake function. In most instances, separate parking brakes are provided although it has been proposed to mechanically actuate the same brake pads that are actuated by the hydraulic, service actuator. Most of the arrangements provided for the combined hydraulic and mechanical actuation of the disk brake pads are extensive and do not lend themselves to high volume production.

It is, therefore, a principal object of this invention to provide an improved hydraulic and mechanical actuator for a disk brake.

It is another object of this invention to provide a simplified, combined service and parking brake of the disk type.

It is a further object of the invention to provide an improved mechanical actuator for a disk brake.

Another reason why disk brakes have not been employed for parking brakes is that disk brakes do not normally provide any self-energization or servo action. Thus, in the absence of some form of power assist sufficient forces cannot be generated with conventional mechanical actuated disk brakes.

It is, therefore, still another object of this invention to provide a combined service and parking brake that provides a servo action when mechanically actuated.

SUMMARY OF THE INVENTION

This invention is adapted to be embodied in a combined hydraulic and mechanical actuator for a disk brake or the like. The actuator includes a housing that defines the cylinder bore of a fluid motor. A piston is received in the cylinder bore, and the piston and housing are relatively movable along the axis of the cylinder bore upon pressurization of the cylinder bore to actuate a brake pad or the like. Annular cam means are juxtaposed to the cylinder bore. The annular cam means includes an element supported for pivotal movement and means for effecting a force substantially in the direction of the axis of the cylinder bore upon pivotal movement of the element for actuating the brake pad.

BRIEF DESCRIPTION OF THE DRAWINGS

FIG. 3 is an enlarged cross sectional view taken along the line 3—3 of FIG. 2.

FIG. 4 is a cross sectional view taken generally along the line 4—4 of FIG. 3.

FIG. 5 is an enlarged cross sectional view taken along the line 5—5 in FIG. 2.

FIG. 6 is an enlarged view of the area encompassed by the circle 6 in FIG. 2.

DETAILED DESCRIPTION OF THE PREFERRED EMBODIMENT

Figure 1:
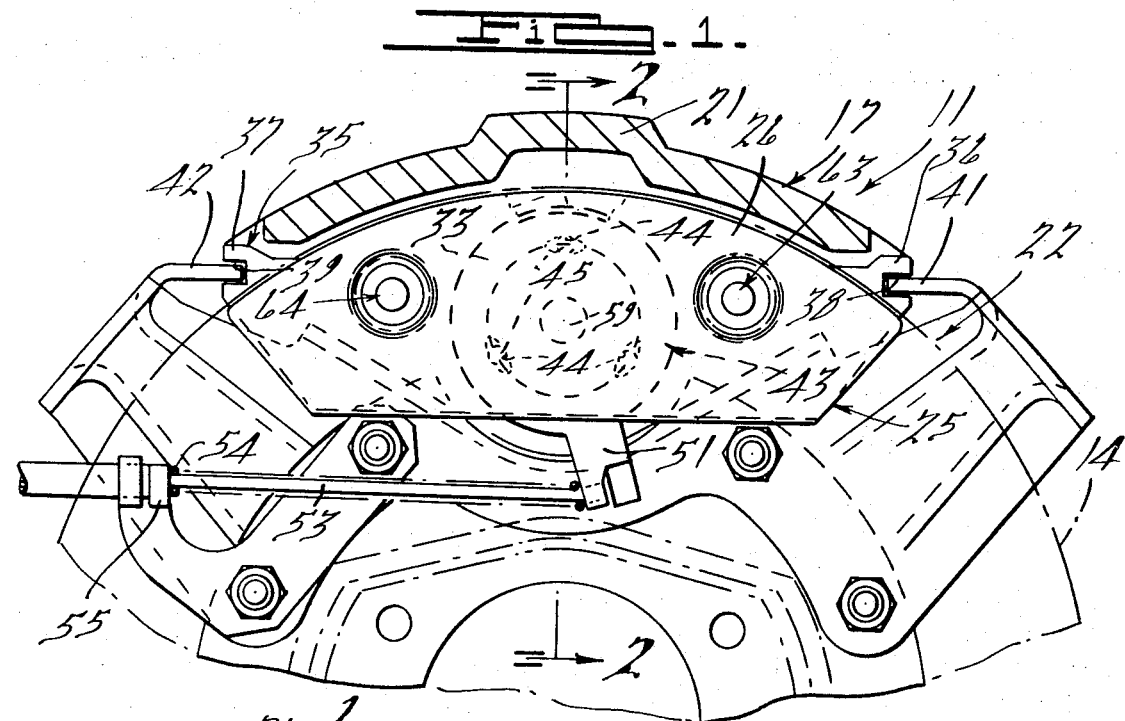
FIG. 1 is a cross sectional view of a disk brake assembly embodying this invention taken along the line 1—1 of FIG. 2.
Figure 2:
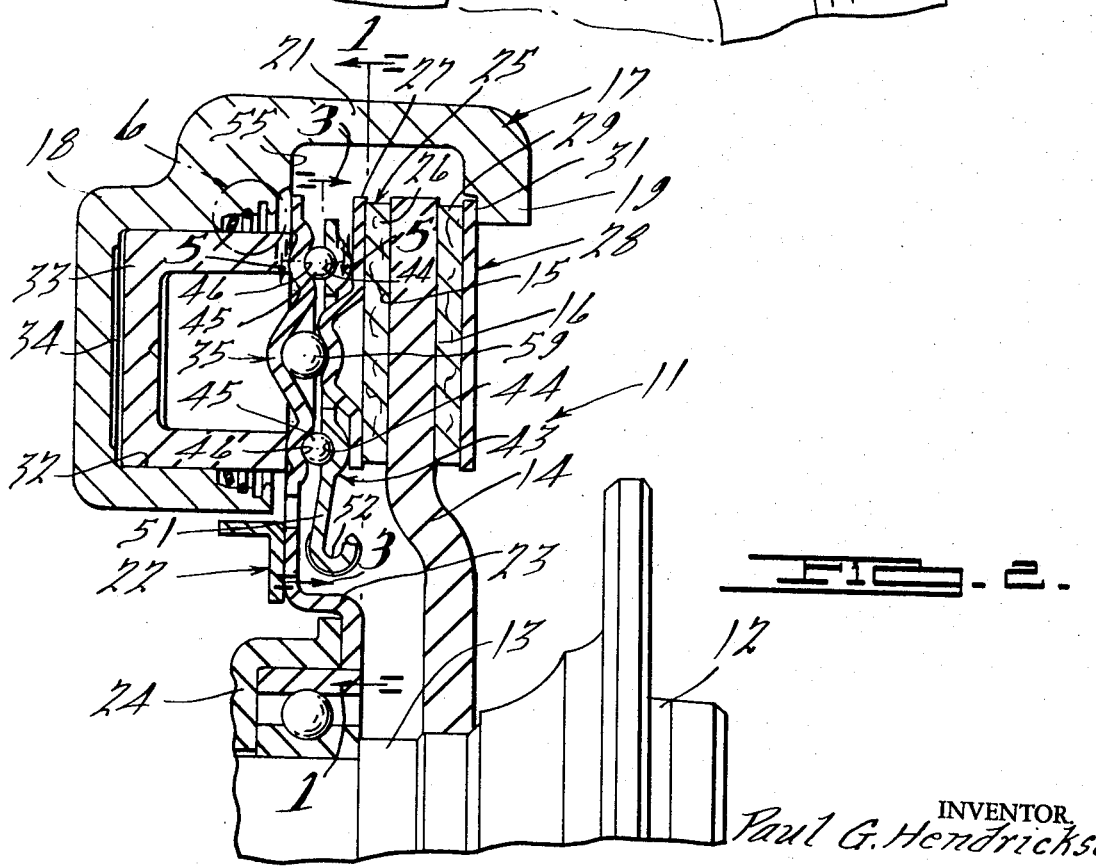
FIG. 2 is a cross sectional view of the brake taken along the line 2—2 of FIG. 1.

An automotive disk brake assembly embodying this invention is identified generally by the reference numeral 11. The disk brake assembly 11 is particularly adapted for use in braking the rear wheels (not shown) of a motor vehicle. The wheel is adapted to be connected to the hub 12 of a rear axle 13. A rotor 14 is secured to the axle 13 in any known manner and has oppositely disposed annular braking surfaces 15 and 16.

In addition to the rotor 14 the brake assembly 11 includes a caliper, indicated generally by the reference numeral 17. The caliper 17 has legs 18 and 19 that are juxtaposed to the rotor braking surfaces 15 and 16, respectively. The caliper legs 18 and 19 are integrally connected by a bridging portion 21.

The caliper 17 is supported for sliding movement relative to the rotor 14 in a direction parallel to the axis of rotation of the rotor 14. The sliding support for the caliper 17 may be of any known type and includes a torque plate 22 that is affixed against rotation through action with a member 23 that is affixed to an axle housing 24.

A first brake pad, indicated generally by the reference numeral 25, is interposed between the caliper leg 18 and the rotor braking surface 15. The first brake pad 25 includes a frictional lining 26 and a backing plate 27. The frictional lining 26 is secured to the backing plate 27 in any known manner, for example, by bonding. A second brake pad, indicated generally by the reference numeral 28, is interposed between the caliper leg 19 and the rotor braking surface 16. The brake pad 28 includes a frictional lining 29 and a backing plate 31 to which the lining 29 is affixed in any known manner, for example, by bonding. The brake pad 28 may be fixed against rotation relative to the caliper leg 19 or may be held against rotation by the torque plate 22.

A hydraulic and mechanical actuator is provided for actuating the brake pad 25 and bringing its lining 26 into frictional engagement with the rotor braking surface 15. The construction of this actuating mechanism will become more apparent as this description proceeds. The actuating mechanism also creates a reactive force upon the caliper 17 that causes it to slide in an axial direction whereupon its leg 19 presses the pad 28 into frictional engagement with the rotor braking surface 16.

The hydraulic actuating means includes a cylinder bore 32 that is formed in the caliper leg 18 and which extends parallel to the axis of rotation of the rotor 14. A piston 33 is slidably supported in the bore 32 and defines with the bore 32 a fluid chamber 34. The chamber 34 is adapted to be selectively pressurized for effecting relative axial movement between the piston 33 and caliper 17.

The outer end of the piston 33 bears against a cam plate 35. The cam plate 35 has outwardly extending flanges 36 and 37 (FIGS. 1 and 3) which flanges are notched at 38 and 39. Inwardly extending flanges 41 and 42 of the torque plate 22 extends into the notches 38 and 39 and hold the cam plate 35 against rotation while permitting axial movement of the cam plate 35.

The outer extremities of the cam plate 35 are engaged with the brake pad backing 27 so that axial forces exerted by the piston 33 will be transmitted through the cam plate 35 to the backing plate 27. At the same time an axial force is exerted upon the brake pad 25 by the piston 33, a reactive force is exerted upon the caliper 17 for sliding it and actuating the brake pad 28. The brake pads 25 and 28 are, thereby, hydraulically actuated.

An annular cam element, indicated generally by the reference numeral 43 is interposed between the cam plate 35 and the backing plate 27. The cam element 43 has a plurality (three) of circumferentially spaced pockets 44 in which balls 45 are captured. The balls 45 also are captured in pockets 46 formed in the cam plate 35. On either side of the cam element pockets 44, inclined ramps 47 (FIG. 5) are formed.

The cam element 43 has an outturned tang 48 formed at its upper periphery that is received in a slot 49 formed in the backing plate 27. The tang 48 is normally at one end of the slot 49 and thus limits the angular position of the cam element 43 in one of its extreme positions.

The cam element 43 has a downwardly extending projection 51 that has a boss 52 formed at its lower extremity. A flexible transmitter 53 is connected to the boss 52 at one end. The opposite end of the flexible transmitter 53 is connected to a suitable actuator (not shown) positioned within the driver's compartment of the vehicle. A return spring 54 encircles the one end of the flexible transmitter 53 and bears against the boss 52 and against a fixed abutment member 55 that is fixed relative to the torque plate 22. The spring 54 normally urges the cam element 43 in a clockwise direction as viewed in FIG. 3.

In order to mechanically actuate the brake assembly 11, a pull is inserted upon the flexible transmitter 53. This pull causes the cam element 43 to rotate in a counterclockwise direction. The axis of rotation of the cam element 43 is coincident with the axis of the cylinder bore 32. When the cam element 43 rotates, the balls 45 will engage the ramps 47 and an axial force will be exerted upon the cam element 43. This force is transmitted to the backing plate 27 and effects axial movement of the brake pad 25 into engagement with the rotor braking surface 15. At the same time, a reactive force is exerted through the balls 45 onto the cam plate 35. This force is transmitted through the piston 33 to the caliper 17 in a manner to be described and causes the caliper 17 to slide in an axial direction. The sliding movement brings the brake pad 28 into engagement with the rotor braking surface 16. When the pull on the cable 53 is released, the spring 54 will return the cam element 43 to its retracted position.

In addition to providing for the mechanical and hydraulic actuation of the brake pads 25 and 28, brake assembly 11 generates a self-energizing or servo force when mechanically actuated. To accomplish this, the cam plate 35 is formed with a depressed central portion 56 formed by a conical surface 57. A ball 59 is normally positioned at the base of the conical surface 57. The ball 59 is larger in diameter than the balls 45. The backing plate 27 is formed with an embossment 61 that also receives and captures the ball 59. It will be noted that the cam element 43 has a central opening 52 that passes the embossment 61.

A pair of spaced apart rivets 63 and 64 are affixed to the backing plate 27 within respective embossments 65 and 66. The rivets 63 and 64 have enlarged diameter cylindrical portions 67 and 68 that are received in still larger diameter openings 69 and 71 formed in the cam plate 35. Snap rings 72 and 73 are affixed to the rivets 63 and 64 so as to prevent complete axial separation of the cam plate 35 from the backing plate 27. It should be noted that the cylindrical sections 67 and 68 have sufficient length, however, so as to permit some relative axial movement between the cam plate 35 and the backing plate 27. This axial movement is permitted to allow for the mechanical actuation of the brake. In addition, the larger diameter of the cam plate openings 69 and 71 permits transverse movement of the brake pad 25 relative to the cam plate 35 for a reason now to be described.

When the brake pad 25 is actuated, it tends to rotate in the same direction of rotation as the rotor 14. The size of the openings 69 and 71 permits the backing plate 27 to shift transversely relative to the cam plate 35 during this relative movement. At this time, the ball 59 will roll up the surface 57 in one direction or the other depending upon the direction of rotation of the rotor 14. Due to the inclination of the surface 57, an axial force component will be exerted upon the backing plate 27 when the brake is mechanically actuated. This force component is only experienced during mechanical actuation since at this time the cam plate 35 does not exert any direct actuating force upon the brake pad 25.

Inward movement of the piston 33 is precluded during mechanical actuation by means of a canted ring 75 (FIG. 6) that is interposed between the caliper 17 and piston 33 in a counterbore 76 of the former. The ring 75 is disposed at an angle relative to the axis of the cylinder bore 32 and permits free outward movement of the piston 33 and limited inward movement. Any substantial inward movement of the piston 35 is, however, precluded by wedging of the ring 75 between the counterbore 76 and the piston 33.

It should be readily apparent that the disclosed brake construction has several advantages. A compact mechanical actuator which is interposed between the piston 33 and the brake pad 25 permits convenient mechanical actuation. This mechanical actuation is accomplished with the force being exerted along the same line as that exerted by the hydraulic actuator. This is possible without necessitating complicated seals such as are required if the piston 33 were to be mechanically actuated. In addition, the mechanical actuated brake provides sufficient braking action since a self-energizing force is exerted upon the brake pad 25 when it is mechanically actuated.

It is to be understood that the foregoing description is that of a preferred embodiment of the invention. Various changes and modifications may be made without departing from the spirit and scope of the invention as defined by the appended claims.

I claim:

1. A disk brake assembly for braking the rotation of an associated brake rotor comprising a caliper, at least one brake pad associated with said caliper and having a frictional lining adapted to engage the rotor, said caliper defining a fluid motor including a piston, and a mechanical actuator interposed between said piston and said brake pad for transmitting actuating forces from said piston to said brake pad and for mechanically actuating said brake pad, said mechanical actuator comprising relatively movable elements, means for effecting relative movement of said elements, means for exerting an axial force upon said brake pad upon relative movement of said elements, and means including cooperating camming elements interposed between said piston and said brake pad for exerting a selfenergizing force upon said brake pad only when said brake pad is actuated by said mechanical actuator.

2. A disk brake assembly as set forth in claim 1 further including means for preventing inward movement of the piston upon actuation of the mechanical actuator.

3. A disk brake assembly as set forth in claim 1 wherein the mechanical actuator comprises annular cam means including a pivotally supported element rotatable about a pivot axis aligned with the axis of the cylinder bore for effecting the relative movement.

4. A disk brake assembly as set forth in claim 3 wherein the annular cam means includes a plurality of circumferentially spaced balls, the cam means having pockets for receiving said balls and ramps for exerting the axial force upon pivotal movement of the pivotally supported cam element.

5. A disk brake assembly as set forth in claim 4 wherein the camming elements include a ball element interposed between elements of the mechanical actuator and the brake pad, said actuator elements having inclined surfaces and being supported for relative movement in the direction of rotor rotation for exerting the axial force upon such relative movement.

6. A disk brake assembly as set forth in claim 5 wherein the ball element is concentrically disposed relative to the axis of rotation of the cam element.

* * * * *